No. 741,792. PATENTED OCT. 20, 1903.
W. B. HODGES.
CAN FILLING APPARATUS.
APPLICATION FILED DEC. 12, 1902.
NO MODEL.
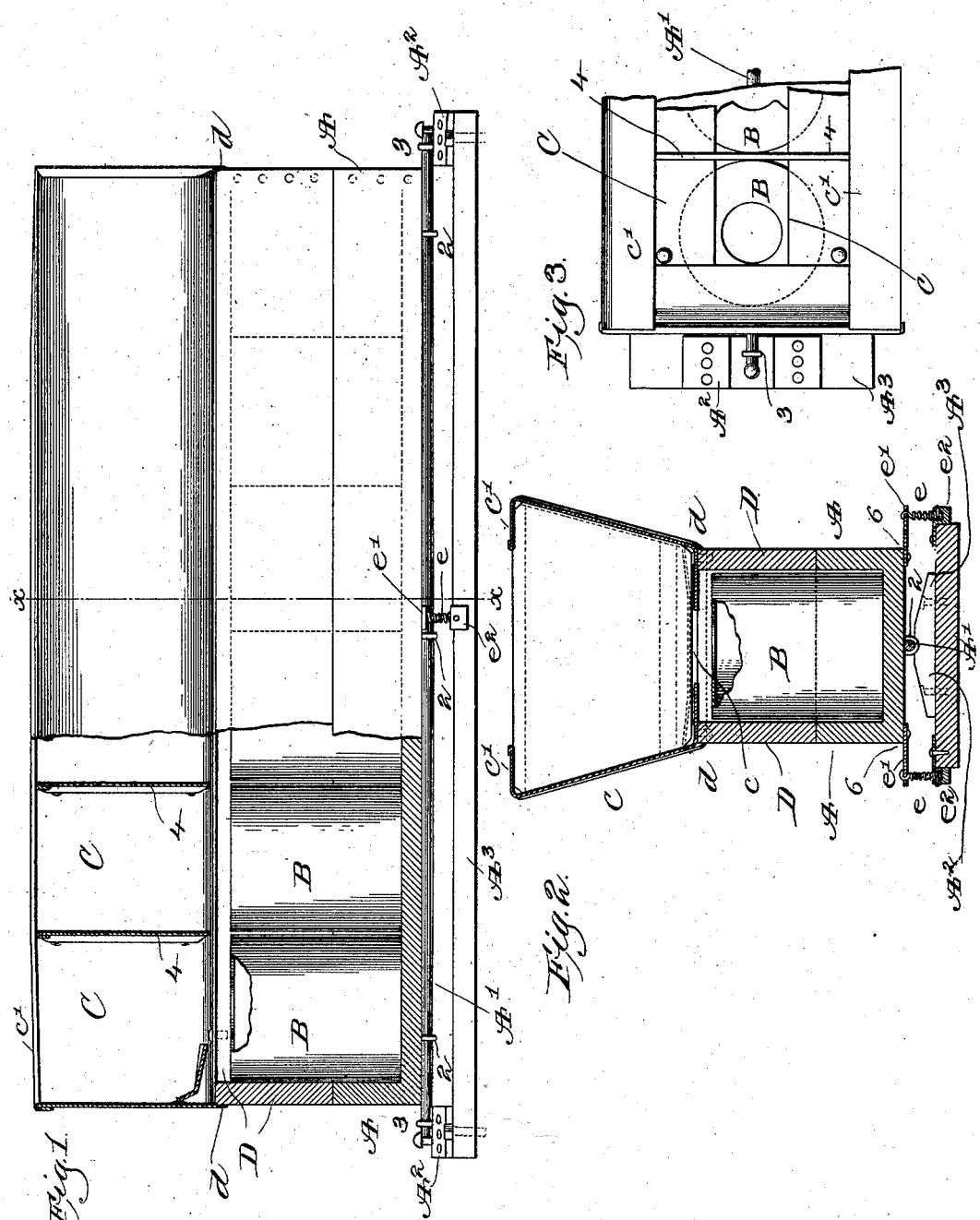
Witnesses:
W. C. Rumford
S. W. Lutton
Inventor:
William B. Hodges,
by Dunby Gregory, attys.

No. 741,792. Patented October 20, 1903.

UNITED STATES PATENT OFFICE.

WILLIAM B. HODGES, OF MEDWAY, MASSACHUSETTS.

CAN-FILLING APPARATUS.

SPECIFICATION forming part of Letters Patent No. 741,792, dated October 20, 1903.

Application filed December 12, 1902. Serial No. 134,885. (No model.)

*To all whom it may concern:*

Be it known that I, WILLIAM B. HODGES, a citizen of the United States, residing at Medway, in the county of Norfolk and State of Massachusetts, have invented an Improvement in Can-Filling Apparatus, of which the following description, in connection with the accompanying drawings, is a specification, like characters on the drawings representing like parts.

This invention has for its object the production of a novel apparatus for filling cans with fruits, vegetables, &c.

My novel apparatus is shown embodied in a pivoted box or device for sustaining a series of cans to be filled and a series of hoppers, each having a discharge-opening, the series of hoppers being sustained, as shown, by a cover or support adapted to embrace the cans to be filled.

Figure 1, in side elevation, represents a can-filling apparatus embodying my invention in one of the best forms now known to me, one side of the apparatus being broken out to show the interior thereof and some of the cans in the box. Fig. 2 is a cross-section in the dotted line $x$, and Fig. 3 is a plan view showing the interior of one of the hoppers and parts of the tops of the cans.

The box or device A to receive the bottom ends of the cans B will be of a width little in excess of the diameter of the can and of greater or less length, according to the number of cans to be filled at one operation—as, for instance, from six to sixty, more or less. The box A is pivoted, as herein shown, substantially centrally with relation to its width by a rod A′, having its ends sustained in bearings $A^2$, mounted, as shown, on a suitable bench or base $A^3$, sustained in any usual manner. The rod is shown as embraced by staples or metallic loops 2 3 to retain it in working position.

The series of hoppers C of any desired number, one for each can to be filled, is supposed to be made of tin, the walls 4 separating one hopper from the other. The bottom of each hopper has a delivery-mouth $c$, through which the fruit or vegetables placed in the hopper may pass into the usual open hole in the top of the can. The upper edges of the hopper are shown as inturned, as at $c′$, to form lips that will prevent the fruit or vegetables placed in the hopper from escaping therefrom as the hoppers are rocked or tipped rapidly in the process of causing said fruit or vegetables to enter automatically the openings in the top of the cans. Each hopper will contain substantially enough fruit or vegetables to fill one can. The lower ends of the hoppers are sustained by side and end walls D D, and lips $d$, depending from the material of the hopper, embrace the upper edge of said walls.

I have shown springs $e$ interposed between the box and the base, and the ends of the springs are connected with the projections $e′$ $e^2$, so that when the box is tipped in one direction one spring will be compressed and the other will be stretched. These springs in practice will be of sufficient strength to normally maintain the bottom of the box in substantially horizontal position.

The apparatus may be tipped by hand or by power.

I find in practice by the use of this apparatus that it is possible to fill fruit and vegetables into the can evenly and compactly and much more rapidly than by hand. In my apparatus it is not necessary to handle by hand the fruit or vegetables put into the hoppers and to enter the cans.

I am aware that a pan having a series of holes has had dumped into it fruit and that by hand the fruit has been moved around in the pan and made to pass through the holes thereof into the cans.

The pivoting of the box between its side edges 6 enables me to effect short, quick, tipping strokes to the hopper that is very effectual in causing the fruit and vegetables to enter correctly and rapidly the holes in the cans to be filled.

Having described my invention, what I claim, and desire to secure by Letters Patent, is—

1. A can-filling apparatus comprising a connected series of hoppers, a centrally-pivoted box to sustain a series of cans to be filled and adapted to be rocked on its central pivotal support to each side thereof, and means between the under side of the series of hoppers and the can-sustaining means to embrace the upper open ends of the series of cans.

2. A can-filling apparatus comprising a connected series of hoppers, a box centrally pivoted between its longitudinal edges to receive and sustain a series of cans and be rocked on its central pivotal support to each side thereof, and means between the under side of the series of hoppers and the can-sustaining means to embrace the upper open ends of the series of cans.

3. A can-filling apparatus comprising a connected series of hoppers having side and end pieces, a centrally-pivoted box to sustain a series of cans to be filled and adapted to be rocked to each side of its pivotal support, the said hoppers having their upper portions open and provided with lips inturned toward each other to prevent material from escaping as the hoppers are rocked with the centrally-pivoted box.

4. A can-filling apparatus comprising a support, a series of hoppers, a box to receive and sustain a series of cans beneath said hoppers, a rod extending centrally beneath the said box and sustained to constitute a central pivotal connection for said box, and springs connecting the box and the support to permit the box to be swung on its pivot toward either side of the support.

In testimony whereof I have signed my name to this specification in the presence of two subscribing witnesses.

WILLIAM B. HODGES.

Witnesses:
CLARKE P. HARDING,
HELEN T. GRANT.